Oct. 19, 1954     S. S. BARKER ET AL     2,691,795
METHOD OF PICKING FOWLS
Original Filed Feb. 6, 1951     3 Sheets-Sheet 1

Inventors.
Seth S. Barker,
and Allen W. Sharp.
By Bair, Freeman & Molinare
Att'ys.

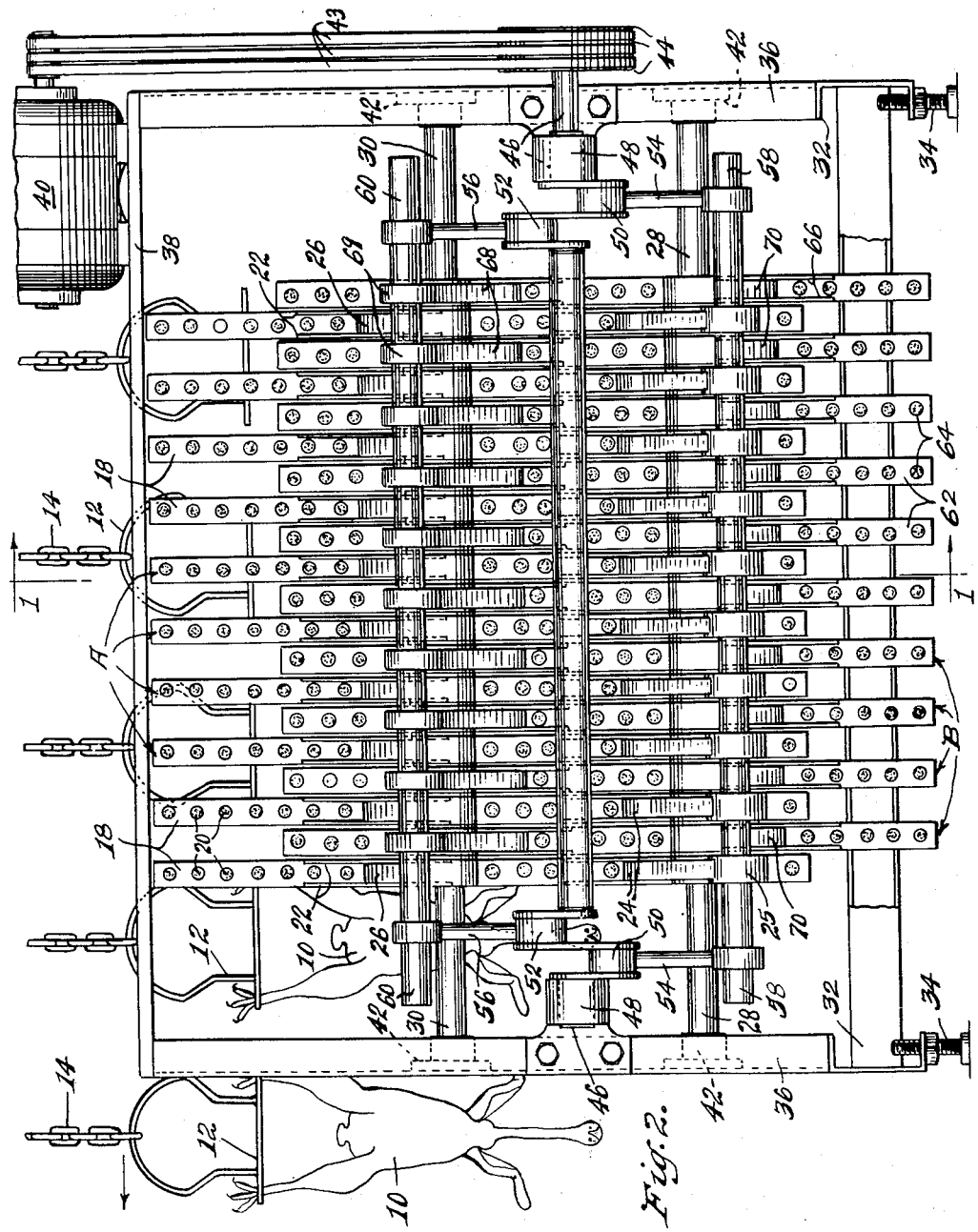

Oct. 19, 1954   S. S. BARKER ET AL   2,691,795
METHOD OF PICKING FOWLS
Original Filed Feb. 6, 1951                         3 Sheets-Sheet 3
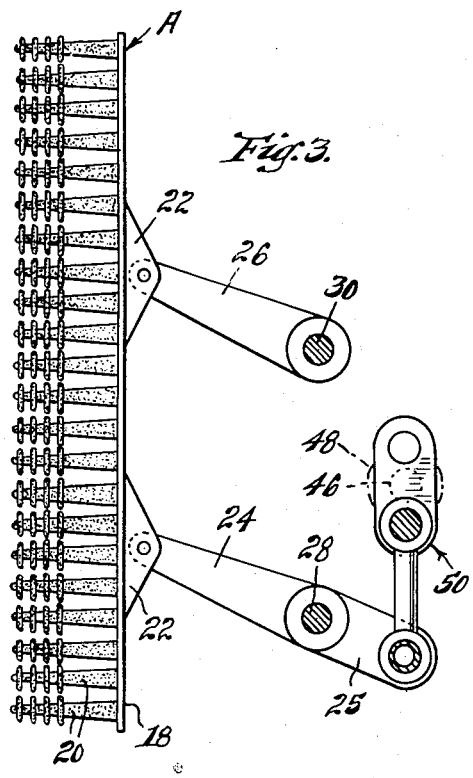
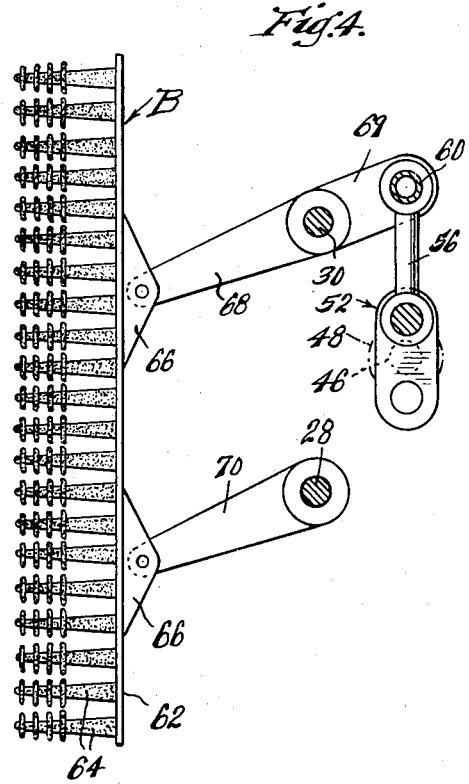
Inventors.
Seth S. Barker,
and Allen W. Sharp.
By Bair, Freeman & Molinare
Attys.

Patented Oct. 19, 1954

2,691,795

UNITED STATES PATENT OFFICE 2,691,795

METHOD OF PICKING FOWL

Seth S. Barker and Allen W. Sharp, Ottumwa, Iowa, assignors to Barker Poultry Equipment Co., Ottumwa, Iowa, a corporation of Iowa Original application February 6, 1951, Serial No. 209,564. Divided and this application May 31, 1952, Serial No. 291,036

8 Claims. (Cl. 17—45)

This application is a divisional application of our co-pending application, Serial Number 209,564, filed February 6, 1951.

This invention relates to a method of picking poultry and more particularly to a method for picking poultry wherein a plurality of picking forces are applied simultaneously to the body of the fowl in a plurality of directions.

In the dressing of poultry, one of the steps is picking the feathers from the fowl. Automatic picking machines have been developed to do this work. These automatic picking machines consist of rotary drums having a plurality of flexible rubber picking fingers extending from the periphery thereof. The dead fowl are generally suspended head down from a conveyor and conveyed between a pair of spaced rotating drums with picking fingers thereon.

The drums generally revolve so that the picking fingers sweep over the bird in a downward direction from the feet towards the head. Because the fingers move in a circular path it is found that the picking action is concentrated in a limited area over the body of the bird. Often, the neck feathers and tail feathers are missed by the picking fingers.

To meet this difficulty, sloping drum machines were introduced. The fowl, in passing between a pair of sloping drum picking machines, thus had different areas of their bodies exposed to the best picking action of the picking fingers. Another way of meeting this difficulty was to install a plurality of pairs of picking machines along the conveyor line placed at different heights so that one set of drums picked substantially halfway between the feet and the head, another pair picked closer to the head, and still another pair picked closer toward the feet.

Still another way of engaging as much of the surface of the fowl as possible was to bodily move the drums vertically as the fowl passed longitudinally past the picking drums.

It was also found that better picking results would be obtained by picking both with the lay of the feathers and against the lay of the feathers. To do this, the fowl was first suspended head down and taken between a pair of rotating drums where the picking was done against the lay of the feathers and then was taken from the shackle and rehung from the shackle by the head with the feet down and taken between a pair of rotating drums where the picking was done with the lay of the feathers.

To eliminate the step of reversing the fowl, a head holding means was introduced in combination with a pair of rotating drums which revolved opposite to the normal direction of rotation so that the picking fingers swept over the body of the fowl from the head towards the feet. The head holder was necessary because otherwise the fowl would be picked up by the upwardly sweeping fingers and be thrown upwardly out of the picking machine.

Of course, the use of sloping drums and drums at different levels and bodily movable drums was made difficult by the introduction of the head holding device and their use was somewhat limited to non-head holding machines. The use of bodily movable drums with a head holding machine required special tracks for moving the drums to avoid the head holder.

Thus, for picking forces applied to the body of the fowl in one direction, it was necessary to use either a sloping drum machine, or bodily movable drums or a plurality of pairs of horizontal drums. And for picking in reverse directions it was necessary to either reverse the fowl on the conveyor and use a plurality of pairs of machines, or to use a machine for picking against the lay of the feathers and a second machine and head holding device for picking with the lay of the feathers.

Another of the disadvantages of the rotary drum type picking machine is that there is a picking force constantly in contact with a portion of the body of the fowl. This often results in barking of the skin of the fowl. Even the bodily movable drums remain in contact with the body of the fowl for a large number of revolutions of the drum and thus a continual picking force is applied to a portion of the skin of the fowl and barking is still obtained.

Thus, one of the objects of this invention is to provide a method of picking fowl whereby picking forces may be applied to the body of a fowl in a plurality of directions without the need of manipulating the fowl in its shackle or the need of employing head holder equipment.

Another object of this invention is to provide a method of picking fowl whereby picking forces may be applied to the body of a fowl with the lay of the feathers and against the lay of the feathers simultaneously without the need of manipulating the fowl in its shackle, or the need of employing head holder equipment.

And still another object of this invention is to provide a method of picking poultry whereby intermittent picking forces are applied to the body of a fowl without the need of employing bodily movable picking drums and tracks for movement thereof.

Still another object of this invention is to provide a method for picking poultry by means of which oppositely moving picking forces are applied simultaneously to the body of the fowl over adjacent portions of the fowl and over opposite sides of the fowl body.

And still another object of this invention is to provide a method of intermittently picking feathers from the body of a fowl.

Still a further object of this invention is to provide a method of picking feathers from a fowl with and against the lay of the feathers.

And still a further object of this invention is to provide a method of picking feathers from a fowl simultaneously with and against the lay of the feathers.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which—

Figure 2 is a side elevation of the machine shown in Figure 1;

Figure 3 is a view of one row of picking fingers from one of the pair of sets of picking fingers, showing the supporting arms for the row of fingers and the connection thereof to the drive shaft;

Figure 4 is similar to Figure 3, except that it is a view of one row of picking fingers from the second of the pair of sets of picking fingers, and shows the relative position of the second set of picking fingers with respect to the first set of picking fingers shown in Figure 3.

Figure 1:
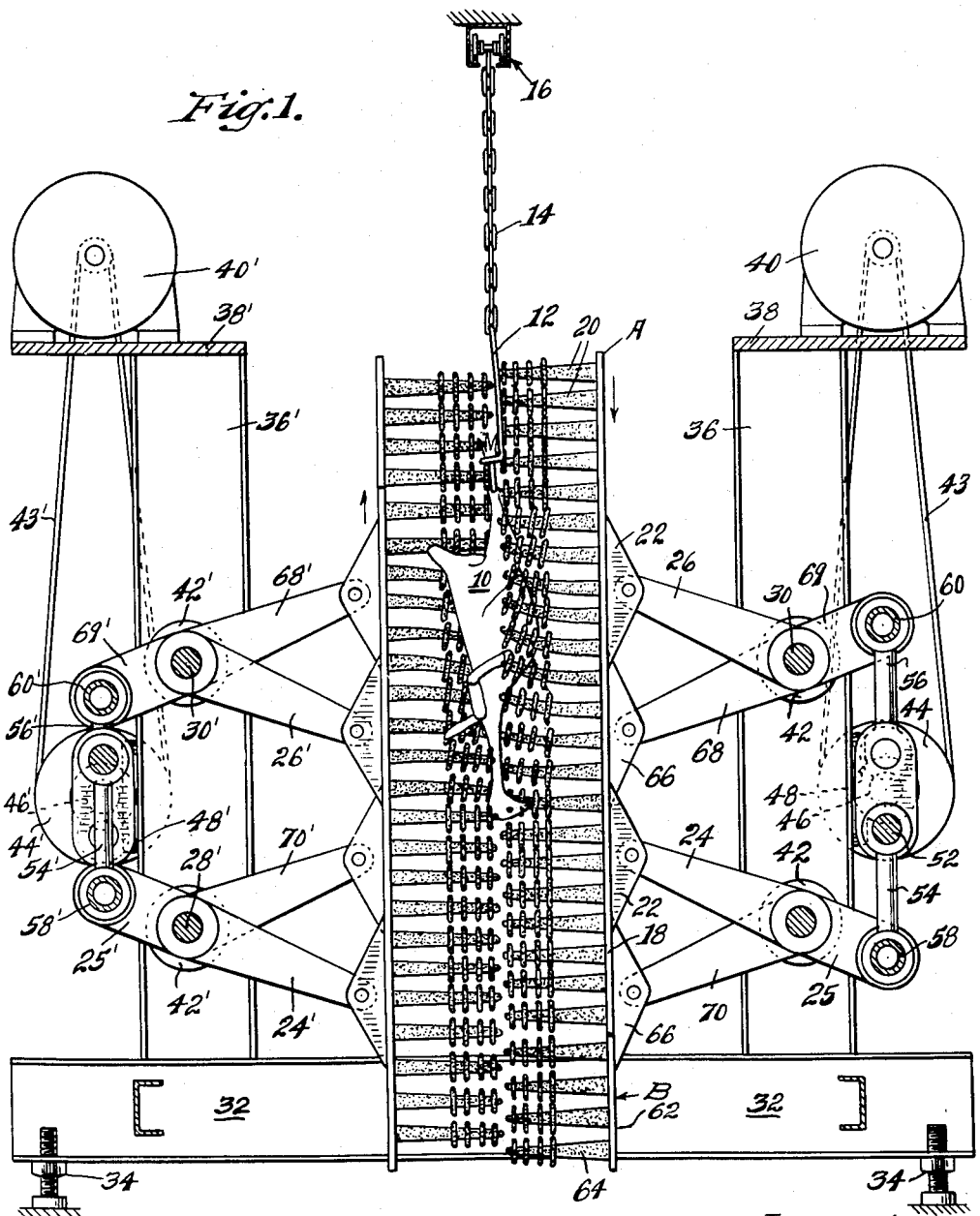
Figure 1 is an elevation view of the poultry picking machine, taken substantially on line 1—1 of Figure 2, and showing a fowl suspended from an overhead conveyor and passing through the picking machine.

Referring now to the drawings, there is shown in Figure 1 a fowl 10 suspended head downwardly by its legs from a shackle 12. The shackle 12 is supported by means of a chain 14 from an overhead conveyor generally indicated at 16. The fowl is conveyed along a predetermined path by means of the conveyor 16. Positioned on opposite sides of the predetermined path, are a pair of picking machines which constitute the subject matter of this invention.

The picking elements of the picking machines are rubber fingers which are mounted in a plurality of sets of vertical rows which are adapted to oscillate so that the fingers move vertically up and down over the body of the fowl as the fowl passes the vertical rows of picking fingers. These vertical rows of picking fingers form banks of picking fingers positioned on opposite sides of the path of the fowl. Since the bank of picking fingers on the left of Figure 1 are complementary to the bank of picking fingers on the right of Figure 1, the numerals applied to the apparatus on the left side of Figure 1 are distinguished by the additions of primes.

For the purposes of description, the rows of picking fingers in one bank of fingers will be described as belonging to the A set of rows and the B set of rows. The rows of picking fingers of both the A and B sets are spaced from each other a distance sufficient to permit interposing between adjacent rows of one set, a row of fingers of the other set. The A rows of fingers move simultaneously in one direction and the B rows of fingers move simultaneously in the opposite direction. The limit of motion of the A and B rows of fingers is substantially shown in Figure 2, the A set being at the upper limit and the B set being at the lower limit. During the next portion of the oscillating cycle, the B rows will move to the upper limit and the A rows will move to the lower limit.

Referring to a single row of picking fingers, a vertical mounting strip or slat 18 has a plurality of picking fingers 20 mounted therein. The mounting strip 18 has a pair of flanges 22 secured to the back side thereof. A pair of arms 24 and 26 have pivotally secured to one end thereof the flanges 22 of mounting strip 18. Each arm 24 and 26 is pivotally mounted respectively on stationary shafts 28 and 30. The arm 24 extends beyond its pivot mount as shown at 25 for a reason to be described hereinafter.

The remainder of the machine consists of the frame for supporting the A and B rows of picking fingers and the motor means for oscillating the rows of picking fingers. The frame consists simply of a base portion 32 supported on adjustable legs 34 and having upright members 36 supported thereon. An upper frame member 38 connects the upper ends of the upright frame members 36 and also provides a support for a drive motor 40.

The stationary shafts 28 and 30 are journaled by means of bearings 42 in the upright members 36 of the frame. The drive means for oscillating the rows of picking fingers includes the drive motor 40 which drives pulleys 44 by means of belts 43. These pulleys 44 are mounted on the end of a crank shaft 46. The crank shaft 46 is journaled in bearings 48 supported by the upright members 36 of the frame, as shown in Figure 2.

The crank shaft 46 has oppositely offset portions 50 and 52 adjacent each end thereof. Connecting rods 54 and 56 are pivotally connected at one end thereof respectively to offset portions 50 and 52. The other ends of connecting rods 54 and 56 are pivotally connected to movable shafts 58 and 60.

The movable tubular shaft 58 is a gang drive member for the A set of rows of picking fingers and the movable tubular shaft 60 is the gang drive member for the B set of rows of picking fingers. The movable shaft 58 has pivotally secured thereto the extended portion 25 of arm 24. It will be seen that as crank shaft 46 rotates, the arm 24—25 is caused to oscillate about shaft 28, the motion of the crank shaft being transmitted to the arm 24—25 by means of connecting rod 54. As the arm 24—25 oscillates, the arm 26 does likewise.

The B set of rows of picking fingers are oscillated in similar manner by means of crank shaft 46, connecting rods 56 and movable shaft 60. The B set comprises slats 62, fingers 64 and supporting flanges 66. Arms 68 and 70 are pivotally connected to flanges 66 and are pivotally mounted respectively on stationary shafts 30 and 28. The movable shaft or gang drive member 60 is pivotally connected to the extended ends 69 of arms 68, as shown in Figures 2 and 4.

The widths of the A and B rows of picking fingers is much less than the width of the body of the fowl over which the picking fingers pass. Accordingly, when an A row of picking fingers is moving downwardly over one portion of the body of the fowl, a B row of picking fingers is moving upwardly over the adjacent portion of the body of the fowl. Since the fowl is moving past the adjacent rows of picking fingers, each portion of the body of the fowl will be subjected to picking forces applied thereto first in one direction and then in the opposite direction, or, more specifically, with the lay of the feathers and against the lay of the feathers.

The tendency of the picking fingers which pass upwardly over the body of the fowl is to throw the body of the fowl upwardly from the machine, but these forces are resisted by opposite forces imposed upon the body of the fowl by the adjacent rows of picking fingers which are moving downwardly over the body of the fowl. By this means, the need of a head holding device is obviated.

In conventional rotating drum type pickers, barking of the skin results from the continuous application of fingers on a certain area in one direction. This tends to heat the skin and cause it to burn a little. It will be seen that in this type of machine, where the picking elements are oscillated, at the end of each stroke there is a slight pause before the fingers are directed back over the body of the fowl. This momentary pause allows the skin to cool to some extent before the picking action starts again.

It will be seen from Figure 1 that every portion of the body of the fowl may be contacted by the protruding fingers which extend from the A and B sets of rows of picking fingers. This insures picking of the entire area of the skin of the bird including the "difficult to get at" areas of the neck, legs, wings and tail. Further, with the picking fingers straight and protruding, as shown in Figure 1, a wide variety of fowl, including turkeys, may be passed through the machine simultaneously, without any adjustment. Conventional machines require adjustment of the picking drums toward and away from each other to accommodate the different sizes of the fowl that are being picked. On the other hand, this machine permits passage therethrough of small chickens, large chickens, and turkeys, without any adjustment.

Since the arms 24 and 26 which support the slats 18 from which the picking fingers 20 protrude, move in an arc, the picking fingers also are moved in the arc of a circle. Thus, at the end of the oscillating stroke, the oppositely facing fingers are farthest away from each other and from the body of the fowl passing the picking fingers. The radius of arc may be varied so that the fingers will not be withdrawn from contact with the body, or, if desired, the radius of the arc may be made so that the fingers sweep over the surfaces of the bird and then are withdrawn from the body of the bird. In some cases, it may be desirable to have the fingers move away from contact with the body of the fowl at the end of each stroke. Besides the variation of the radius of the arc of stroke, this may be provided for by varying the spacing of the oppositely facing machines from each other. Whether or not the fingers are wholly withdrawn from the body of the bird, there is still a pause at the end of each stroke of the operating cycle and thus cooling of the skin is permitted during the picking operation.

The machines on opposite sides of the path of the fowl are not connected in any way to each other. Therefore, any timing of strokes may be provided for on opposite sides of the fowl. The rows of fingers directly opposite each other may either move simultaneously in the same direction or simultaneously in the opposite direction, or a separate timing may be arranged, whereby the strokes of oppositely facing rows of picking fingers are 90°, or some other value, as desired, out of phase.

Although the bank of fingers on opposite sides of the path of travel of the fowl are shown positioned for vertical oscillation, it is evident that one or both banks may be positioned so that the picking fingers sweep crosswise over the body of the fowl, and it is intended in the claims to include such modifications.

While there has been shown and described a particular embodiment of this invention, it will be obvious to those skilled in the art that various changes and modifications may be made therein without departing from the invention, and, therefore, it is intended in the appended claims to cover all such changes and modifications as fall within the true spirit and scope of the invention.

What we claim as new and desire to secure by Letters Patent of the United States is:

1. A method of picking fowl comprising the step of simultaneously applying a pair of picking forces in substantially opposite directions with respect to each other over adjacent portions of one side of the body of a fowl, then pausing, whereby the skin of the fowl is permitted to cool, and then reapplying said picking forces over the body of the fowl in directions opposite to the original directions.

2. A method of picking fowl comprising the step of conveying a fowl suspended from one end thereof along a predetermined path, applying a pair of picking forces simultaneously in substantially opposite directions with respect to each other over adjacent portions of one side of the body of the fowl, then pausing, and then reapplying said picking forces over the body of the fowl in directions opposite to the aforesaid directions.

3. A method of picking fowl comprising the step of conveying a fowl along a predetermined path, applying picking forces simultaneously over adjacent portions of one side of the body of the fowl in opposite directions with respect to each other, then pausing, and then reapplying said picking forces over the body of the fowl in directions opposite to the aforesaid directions.

4. A method of picking fowl comprising the step of conveying a fowl along a predetermined path, applying a pair of picking forces from along one side of said predetermined path simultaneously over adjacent portions of the body of the fowl in substantially opposite directions with respect to each other, then pausing, and then reapplying said picking forces over the body of the fowl in directions opposite to the aforesaid directions, and applying a similar pair of picking forces to the body of the fowl from along the opposite side of said predetermined path.

5. A method of picking fowl comprising the steps of conveying a fowl along a predetermined path, applying a pair of picking forces in opposite directions with respect to each other simultaneously over portions of the body of the fowl from along one side of said predetermined path, and, simultaneously with the application of said pair of picking forces, applying other picking forces over portions of the body of the fowl from along the opposite side of said predetermined path.

6. A method of picking fowl comprising the steps of conveying a fowl along a predetermined path, applying a pair of picking forces in opposite directions with respect to each other simultaneously over portions of the body of the fowl from along one side of said predetermined path, and, simultaneously with the application of said pair of picking forces, applying another pair of picking forces in opposite directions with respect to each other over portions of the body of the fowl from along the opposite sides of said predetermined path, and the pair of opposite directions of movement of picking forces along one side of said predetermined path being substantially parallel to the pair of opposite directions of movement of the picking forces along the opposite side of said predetermined path.

7. A method of picking fowl comprising the step of pulling feathers in one direction simultaneously from a plurality of spaced portions on one side of the body of the fowl, and simultaneously pulling feathers in the opposite direction to said one direction from the portions of the body of the fowl between said spaced portions.

8. A method of picking fowl comprising the step of conveying a fowl along a predetermined path, and, from along one side of said predetermined path, pulling feathers in one direction simultaneously from a plurality of spaced portions on one side of the body of the fowl, and simultaneously pulling feathers in the opposite direction to said one direction from the portions of the body of the fowl between said spaced portions.

References Cited in the file of this patent

UNITED STATES PATENTS

| Number | Name | Date |
| --- | --- | --- |
| 1,889,228 | Swanson | Nov. 29, 1932 |
| 2,389,404 | Barker | Nov. 20, 1945 |
| 2,444,556 | Drews | July 6, 1948 |
| 2,469,345 | Toti et al. | May 3, 1949 |
| 2,472,468 | Digby | June 7, 1949 |
| 2,571,034 | Harvey | Oct. 9, 1951 |